Patented Aug. 7, 1934

1,968,913

UNITED STATES PATENT OFFICE 1,968,913

METHOD OF REMOVING PRIMARY AROMATIC AMINES FROM AQUEOUS SOLUTIONS

Waldo L. Semon, Silver Lake Village, Ohio, assignor to The B. F. Goodrich Company, New York, N. Y., a corporation of New York No Drawing. Original application August 22, 1928, Serial No. 301,439. Divided and this application May 22, 1933, Serial No. 672,225

4 Claims. (Cl. 260—130.5)

This invention relates to the art of manufacturing organic chemicals and has as its object to provide a method for the purification of certain aromatic compounds and particularly to provide a method for precipitating them from aqueous solution.

Many aromatic compounds, such as the aromatic amines, and the aromatic hydroxy compounds, known generically as phenols, are manufactured commercially in aqueous solution, or are purified from such a solution. However, these compounds are all more or less soluble, which makes quantitive recovery, and separation from impurities and by-products difficult and expensive. This invention, in brief, consists in precipitating the above-mentioned phenols and aromatic amines in the form of the substantially insoluble phenol-amine salts.

It is well-known that trivalent nitrogen compounds, such as amines, are capable of adding acids, or certain inorganic salts or organic compounds. For example, the formation of the hydrochlorides of amines is a well-known phenomenon, often useful in the separation or identification of such compounds.

The addition compounds of amines with zinc chloride, gold chloride, platinum chloride, or with picric acid, etc. are also well-known. Less known, however, are the addition products of amines with phenols. Such addition products are crystalline substances, moderately stable when maintained dry and neutral, and are readily prepared by reacting the appropriate amine and phenol, preferably in equimolecular proportions, either in the solid or the molten state, or in solution in an appropriate solvent. It is to the precipitation of such addition products, or salts of amines and phenols, from aqueous solution that this invention particularly relates.

The aromatic amines, in general, have been prepared by the reduction in aqueous solution of the corresponding nitro or nitroso compounds, purified either by steam distillation, which may entail a considerable loss of the amine by solution in the aqueous layer of the distillate, or by a solvent extraction, which is expensive and relatively inefficient. In accordance with the present invention they are precipitated by adding to the aqueous solution an equivalent amount or an excess of a phenol such as ordinary phenol (hydroxy-benzene), but preferably a poly-hydroxy phenol or a phenol of higher molecular weight such as hydroquinone, naphthol, etc. The process is generally applicable to the precipitation of any more or less water-soluble aromatic amine, but is particularly valuable in the case of the amines which are so soluble that they do not separate from the solution after reduction is complete. For example, p-amino-dimethylaniline is made by reducing p-nitroso-dimethylaniline with iron and hydrochloric acid. The p-amino-dimethylaniline remains in solution after neutralization and filtration of the mixture, and is customarily extracted with benzene. However, if an equivalent amout of beta-naphthol is added, the p-amino-dimethylaniline is quantitatively precipitated as the beta-naphtholate. The constituents of this salt may be again separated if desired by adding an acid and extracting the amine salt with water, or by adding an alkali such as sodium hydroxide to fix the naphthol, and distilling off the amine. However, for many purposes it may be desirable to use the naphthol amine salt directly rather than to attempt to separate the naphthol and amine.

As an other example of an application of this method, p-phenylene-diamine has heretofore been reacted with an excess of beta-naphthol to form symmetrical di-beta-naphthyl-p-phenylene-diamine. However, the p-phenylene-diamine is quite expensive, because of the difficulty of recovering it from the aqueous solution after the preparation by the usual method of reducing the corresponding nitro or azo compound. By using the process of this invention, the p-phenylene-diamine may be quantitively recovered from the filtered, neutral solution by adding the desired excess of beta-naphthol. The mixture of the p-phenylene-diamine-di-beta-naphtholate with the excess beta-naphthol may be reacted directly in the well known manner to form the aforementioned di-beta-naphthyl-p-phenylene-diamine.

If it is desired to obtain a precipitate of the pure phenol-amine salt, not containing an excess of either material, an excess of a soluble phenol, such as resorcinal, hydroquinone, or even phenol (hydroxy-benzene) may be added to the solution of the amine. The excess will then remain in solution and will not contaminate the precipitate.

As indicated above, this method is equally applicable to the precipitation of phenols from solution by adding amines to the solution. For example, hydroquinone may be precipitated from its water solution by adding an amine, such as aniline. The constituents of the hydroquinone-aniline salt may conveniently be separated by fractional distillation. The salt is decomposed by heat and the aniline distills off first.

The symmetrical dinaphthyl-p-phenylenediamine, referred to above, has also been prepared by reacting naphthylamine with hydroquinone. But since the process of manufacturing hydroquinone involves separation from an aqueous solution, the hydroquinone may be precipitated from the solution by the method of this invention as the naphthylamine salt by adding the appropriate amount of naphthylamine to the solution, and the dinaphthyl-p-phenylene-diamine may then be prepared directly from this salt in the well known manner by simply heating. The symmetrical diphenyl-p-phenylene-diamine may similarly be prepared by heating the dianiline salt of hydroquinone.

It is evident, from the above examples, that it is frequently advantageous to precipitate water-soluble amines or phenols as the phenol-amine salts, and especially so when it is possible to use the salt so formed directly, without separation of the ingredients. In addition to the substances mentioned any of the following phenols may be employed to form typical insoluble salts with the following amines, or vice-versa:

| Phenols | Amines |
|---|---|
| Phenol. | Aniline. |
| Nitrophenols. | Amino-phenols. |
| Chlorphenols. | Nitraniline. |
| Resorcinol. | Toluidines, xylidines. |
| Catechol. | Diamino benzenes. |
| Hydroquinone (quinol). | (Phenylene-diamines.) |
| Pyrogallol. | p-amino-diphenylamine. |
| Naphthols. | p-amino-dimethylaniline. |
| Substituted naphthols. | Naphthylamines. |
| Dihydroxynaphthalenes. | Diaminonaphthalenes. |
| Hydroxyanthracenes. | Benzidine. |
| Hydroxyanthraquinones (Alizarine, purpurin, etc.) | Diamino diphenylmethane. |

However, it will be found most advantageous to carry out this invention with phenols and amines of higher molecular weight such as polyhydroxy or poly-amino compounds, or derivatives of condensed ring nuclei which form salts of comparatively high melting points and almost completely insoluble in water. The salts of low molecular weight and low melting points, such as the phenol-aniline salt, tend to absorb water with the formation of liquids which are less readily separated from the water than solid precipitates.

While specific examples have been given, and certain phenols and amines have been mentioned as being capable of forming phenol-amine salts, it is not intended to limit this invention thereto, but to include in general the precipitation of substantially insoluble salts formed by the addition of aromatic hydroxy-compounds to primary aromatic amino-compounds.

This application is a division of my co-pending application Serial No. 301,439, filed August 22, 1928, and which has matured into U. S. Patent No. 1,942,838, issued January 9, 1934.

I claim:

1. The method of removing p-amino-dimethyl-aniline from aqueous solution which comprises adding hydroquinone and recovering the precipitated p-amino-dimethylaniline-salt of hydroquinone.

2. The method of removing primary aromatic amines from aqueous solution which comprises adding a polyhydroxy benzene and removing the precipitated salt of the amine with the polyhydroxy benzene.

3. The method of removing a primary aromatic amine from aqueous solution which comprises adding hydroquinone and removing the precipitated hydroquinone-amine salt.

4. The method of removing aniline from aqueous solution which comprises adding hydroquinone and removing the precipitated hydroquinone-aniline salt.

WALDO L. SEMON.